United States Patent [19]

Grunberg

[11] E Re. 28,636

[45] Reissued Dec. 2, 1975

[54] ANTIBACTERIAL COMPOSITION CONTAINING 5-METHYL-3-SULFANILAMIDOISOXAZOLE AND TRIMETHOXYBENYL PYRIMIDINE

[75] Inventor: Emanuel Grunberg, North Caldwell, N.J.

[73] Assignee: Hoffmann-La Roche Inc., Nutley, N.J.

[22] Filed: Jan. 28, 1974

[21] Appl. No.: 437,577

Related U.S. Patent Documents

Reissue of:

[64] Patent No.: 3,515,783
Issued: June 2, 1970
Appl. No.: 676,700
Filed: Oct. 20, 1967

[52] U.S. Cl. ..... 424/229; 424/251
[51] Int. Cl.[2] ..... A61K 31/505
[58] Field of Search ..... 424/251, 229

[56] References Cited

UNITED STATES PATENTS

| | | | |
|---|---|---|---|
| 2,909,522 | 10/1959 | Hitchings | 260/256.4 |
| 3,249,603 | 5/1966 | Bretschneider et al. | 260/239.75 |
| 3,341,541 | 9/1967 | Hoffer | 424/251 |

FOREIGN PATENTS OR APPLICATIONS

| | | |
|---|---|---|
| 1,453,056 | 8/1966 | France |
| 6,514,178 | 5/1966 | Netherlands |
| 671,982 | 5/1966 | Belgium |

OTHER PUBLICATIONS

Derwent Basic No. 21,416, of So. African Pat. 65/5618.

*Primary Examiner*—V. D. Turner
*Attorney, Agent, or Firm*—Samuel L. Welt; Jon S. Saxe; Gerald S. Rosen

[57] ABSTRACT

Antibacterial compositions containing 5-methyl-3-sulfanilamidoisoxazole and 2,4-diamino-5-(3,4,5-trimethoxybenzyl)-pyrimidine are described.

2 Claims, No Drawings

ANTIBACTERIAL COMPOSITION CONTAINING 5-METHYL-3-SULFANILAMIDOISOXAZOLE TRIMETHOXYBENYL PYRIMIDINE

Matter enclosed in heavy brackets [ ] appears in the original patent but forms no part of this reissue specification; matter printed in italics indicates the additions made by reissue.

BRIEF SUMMARY OF THE INVENTION

A therapeutically active antibacterial composition comprising 5-methyl-3-sulfanilamidoisoxazole or a salt thereof with a pharmaceutically acceptable base and 2,4-diamino-5 -(3,4,5 - trimethoxybenzyl) - pyrimidine or a salt thereof with a pharmaceutically acceptable acid.

BACKGROUND OF THE INVENTION

The sulfonamide, 5 - methyl - 3 - sulfanilamidoisoxazole, and salts thereof with pharmaceutically acceptable bases, are known antibacterial compounds. Moreover, it is also known that various microorganisms, which are at first susceptible to treatment with well-known sulfonamides, develop a resistance which ultimately results in drug-fast strains.

Accordingly, it was of particular interest to develop a combination of sulfonamide and activator which is effective against such sulfonamide resistant strains. Unexpectedly, it has now been found that the combination of this invention is medicinally effective, for example, against a sulfonamide resistant strain of Proteus vulgaris.

2,4 - diamino-5-(3,4,5-trimethoxybenzyl)pyrimidine and a process for the preparation thereof are disclosed in U.S. Pat. No. 2,909,522. 5-methyl-3-sulfanilamidoisoxazole and a process for the preparation thereof are disclosed in U.S. Pat. No. 2,888,455.

DETAILED DESCRIPTION

In its most comprehensive embodiment, the present invention relates to pharmaceutical compositions containing 5-methyl-3-sulfanilamidoisoxazole or a salt thereof with a pharmaceutically acceptable base and 2,4-diamino-5-(3,4,5-trimethoxybenzyl)pyrimidine or a salt thereof with a pharmaceutically acceptable acid useful in the treatment of bacterial infections in warm-blooded animals.

In a more particular embodiment, the invention relates to pharmaceutical compositions, in suitable oral dosage forms, which compositions comprise 5-methyl-3-sulfanilamidoisoxazole or a salt thereof with a pharmaceutically acceptable base and 2,4 - diamino-5-(3,4,5-trimethoxybenzyl)pyrimidine or a salt thereof with a pharmaceutically acceptable acid useful in the treatment of bacterial infections in warm-blooded animals.

Still further, embodiments of the invention reside in the formulation of pharmaceutical compositions into suitable oral dosage forms and in the use of such combinations in the treatment of resistant bacterial infections, such as those with Proteus vulgaris in warm-blooded animals.

The expression "salts thereof with pharmaceutically acceptable bases" utilized throughout the present specification to denote salts of 5-methyl-3-sulfanilamidoisoxazole, preferably includes those formed utilizing an alkali metal base, such as sodium hydroxide, potassium hydroxide, etc.

The expression "salts thereof with pharmaceutically acceptable acids" utilized throughout the present specification to denote salts of 2,4-diamino-5-(3,4,5-trimethoxybenzyl)pyrimidine, preferably includes those formed utilizing mineral acids, such as hydrochloric acid, sulfuric acid, etc.; and organic acids, such as acetic acid, citric acid, lactic acid, maleic acid, salicylic acid, etc.

The compositions of this invention are prepared simply by admixing 5-methyl-3-sulfanilamidoisoxazole or a salt thereof with a pharmaceutically acceptable base and 2,4-diamino - 5 - (3,4,5 - trimethoxybenzyl)pyrimidine or a salt thereof with pharmaceutically acceptable acid.

The mixture is ultimately embodied in a suitable oral dosage form. For example, the compositions of this invention can be compressed by usual methods into single or multi-layer tablets. Moreover, the preparations can be produced in the form of coated tablets. Additionally, the preparations of this invention can be provided in the form of hard-shell capsules. In general, the various oral dosage forms of the present compositions are prepared by the conventional procedures and techniques of the art. The applicability of such methods and techniques to the formulation of the compositions of the present invention will be readily apparent to those skilled in the art.

It is also within the scope of this invention to administer each active component of the mixture individually. Thus, it is possible suitably to formulate each of the components into separate dosage forms in accordance with procedures hereinbefore and hereinafter described for the combination.

In addition to the therapeutically active ingredients mentioned heretofore, the compositions of this invention can contain, as optional ingredients, any of the various adjuvants which are used ordinarily in the production of pharmaceutical preparations. Thus, for example, in formulating the present compositions into the desired oral dosage forms, one may use, as optional ingredients, fillers, such as coprecipitated aluminum hydroxide-calcium carbonate, dicalcium phosphate or lactose; disintegrating agents, such as maize starch; and lubricating agents, such as talc, calcium stearate, and the like. It should be fully understood, however, that the optional ingredients herein named are given by way of example only and that the invention is not restricted to the use hereof. On the contrary, other such adjuvants, the identity and use of which are well known in the art, can be, and are, employed in carrying out this invention.

The ratios in which the therapeutically active components are utilized in the compositions of this invention can be varied within wide limits. For example, the compositions can contain from about 1 to about 30 parts of 5 - methyl - 3 - sulfanilamidoisoxazole or an equivalent amount of a salt thereof to one part of 2,4-diamino-5-(3,4,5 - trimethoxybenzyl)pyrimidine or an equivalent amount of salt thereof, preferably from about 5 to about 15 parts of 5 - methyl - 3 - sulfanilamidoisoxazole or an equivalent amount of a salt thereof to one part of 2,4-diamino - 5 - (3,4,5-trimethoxybenzyl)pyrimidine or an equivalent amount of salt thereof.

The composition of the present invention can be administered in unit dosage forms which contain 500 mg.

of 5-methyl-3-sulfanilamidoisoxazole or an equivalent amount of a salt thereof and from about 25 mg. to about 100 mg. of 2,4-diamino-5-(3,4,5-trimethoxybenzyl)pyrimidine or an equivalent amount of a salt thereof. However, it is also within the scope of this invention to utilize a unit dosage form which will contain from about 250 mg. to about 750 mg. of 5-methyl-3-sulfanilamidoisoxazole or an equivalent amount of a salt thereof and from about 12.5 mg. to about 75 mg. of 2,4-diamino-5-(3,4,5-trimethoxybenzyl)pyrimidine or an equivalent amount of a salt thereof. The frequency with which any such unit dosage form will be administered to a warm-blooded animal will vary, depending upon the quantity of medicament present therein and the needs and requirements of the warm-blooded animal. Under ordinary circumstances, however, up to about a total of 60 mg./kg. of 5-methyl-3-sulfanilamidoisoxazole and up to about a total of 8 mg./kg. of 2,4-diamino-5-(3,4,5-trimethoxybenzyl)pyrimidine, in combination, can be administered daily in several oral doses.

The foregoing, notwithstanding, it should be fully understood that the dosages set forth herein are exemplary only and they do not, to any extent, limit the scope or practice of the present invention. As indicated hereinbefore, the combination of this invention has unexpectedly been found to be particularly useful in the treatment of bacterial infections in warm-blooded animals which are caused by resistant strains of bacteria.

The invention will be understood better by reference to the following examples which are given for illustration purposes and are not meant to limit the invention.

Example 1

The activity of the combination of the present invention against resistant organisms was demonstrated by the following procedure:

Swiss albino mice weighing 18 to 20 grams were infected intraperitoneally with 100 to 1000 minimal lethal doses of the resistant organism, which was obtained from an overnight broth culture. In all cases the inoculum was diluted in 5% hog gastric mucin.

For all infections, the test animals were treated orally by gavage with 1.0 ml. of the desired concentration of the single drug or the appropriate sulfonamide-pyrimidine combination in 1% carboxymethylcellulose. Treatment consisted of a total of 4 doses administered once daily for 4 days with the first dose administered 5–10 minutes after infection. When combinations were administered, varying concentrations of sulfonamide were prepared in the presence of an inactive concentration of 2,4-diamino-5-(3,4,5-trimethoxybenzyl)-pyrimidine. The experimental observation period was 14 days. Heart blood from mice succumbing during this period of time was cultured on appropriate solid media to determine the presence or absence of the infecting organism. Results obtained are given in Table I.

TABLE I

[The activity of sulfamethoxazole[1] alone and in combination with trimethoprim[2] against infection of mice with strain of *Proteus vulgaris* resistant to sulfamethoxazole is set forth below]

| Organism | Sulfamethoxazole Dose, mg./kg. per os | Survival Rate[3] | Combination: Sulfamethoxazole Dose, mg./kg. per os | Plus | Trimethoprim Dose, mg./kg. per os | Survival Rate | Trimethoprim Dose, mg./kg. per os | Survival Rate |
|---|---|---|---|---|---|---|---|---|
| *Proteus vulgaris* | 1,000 | 0/8 | 1,000 | Plus | 50 | 6/8 | | |
| | 500 | 0/8 | 500 | do. | 50 | 7/8 | | |
| | 200 | 1/8 | 200 | do. | 50 | 7/8 | | |
| | 100 | 0/8 | 100 | do. | 50 | 7/8 | | |
| | 50 | 1/8 | 50 | do. | 50 | 8/8 | 50 | 0/8 |
| | 20 | | 20 | do. | 50 | 2/8 | | |
| | 0 | 0/8 | | | | | | |
| | | | $CD_{50}$,[4] mg./kg. per os | | | | | |
| | >1,000 | | 37 | | | | >50 | |

[1]5-methyl-3-sulfanilamidoisoxazole – $LD_{50}$ in mice P.O.=2,250 mg./kg. after 72 hours.
[2]2,4-diamino-5-(3,4,5-trimethoxybenzyl)pyrimidine – $LD_{50}$ in mice P.O.=2,350 mg./kg. after 72 hours.
[3]No. of survivors/No. of infected and treated animals.
[4]$CD_{50}$ was calculated according to method of Reed and Muench, Am. J. Hyg. 27: 493–497, May 1938.

Example 2

The unexpectedly increased activity of 5-methyl-3-sulfanilamidoisoxazole when combined with 2,4-diamino-5-(3,4,5-trimethoxybenyzyl)pyrimidine in the treatment of various bacterial infections, was demonstrated utilizing the procedure set forth in Example 1. Results obtained are given in Table II.

TABLE II

[The antibacterial effect of sulfamethoxazole alone and in combination with trimethoprim against bacterial infections in mice is set forth below]

| Organism | $CD_{50}$, mg./kg. per os: Sulfamethoxazole Dose, mg./kg. per os | Trimethoprim Dose, mg./kg. per os | Plus | Sulfamethoxazole Dose, mg./kg. per os | Increased Activity[1] (x-fold) |
|---|---|---|---|---|---|
| *S. hemolyticus* No. 4 | 200 | 50 | Plus | 32 | 6.2 |
| *D. pneumoniae* No. 6301 | >1,000 | 50 | do. | 463 | >2.2 |
| *S. aureus* Smith | 154 | 10 | do. | <6.25 | >24.6 |
| *E. coli* No. 257 | 105 | 10 | do. | 20 | 5.3 |
| *P. vulgaris* No. 190 | 25 | 2 | do. | 9 | 2.8 |
| *P. aeruginosa* B | 107 | 50 | do. | 78 | 1.3 |

[1]Increased Activity (x-fold)= $\frac{\text{Dose Sulfonamide alone}}{\text{Dose Sulfonamide in Combination}}$

[2]These doese of trimethoprim when administered alone are inactive.

Example 3

| Tablet formulation: | Per tablet, mg. |
|---|---|
| 5-methyl-3-sulfanilamidoisoxazole | 505 |
| 2,4-diamino-5-(3,4,5-trimethoxybenzyl) pyrimidine | 51 |
| Cornstarch | 30 |
| Lactose | 82 |
| Gelatin | 12 |
| Talcum | 15 |
| Magnesium stearate | 5 |
| Total | 700 |

Preparation.—505 parts of 5-methyl-3-sulfanilamidoisoxazole, 51 parts of 2,4-diamino-5-(3,4,5-trimethoxybenzyl pyrimidine and 82 parts of lactose were thoroughly mixed in suitable blending equipment and granulated with a solution containing 12 parts of gelatin. The moist mass was passed through a No. 12 screen, and the granules were dried on paper-lined trays overnight. The dried granules were passed through a No. 14 screen and placed in a suitable mixer. Thereafter, 12 parts of talcum and 5 parts of magnesium stearate were added and blended. The granulation was compressed into tablets weighing approximately 700 mg. each, using punches having an approximate diameter of 12.7 mm. (½''). the final tablet thickness was about 5.35 mm.

Example 4

| Tablet formulation: | Per tablet, mg. |
|---|---|
| 5-methyl-3-sulfanilamidoisoxazole | 252.50 |
| 2,4-diamino-5-(3,4,5-trimethoxybenzyl) pyrimidine | 63.75 |
| Lactose | 73.75 |
| Cornstarch, U.S.P. | 60.00 |
| Prehydrolyzed cornstarch | 70.00 |
| Talc | 15.00 |
| Cornstarch, U.S.P.—dry | 10.00 |
| Magnesium stearate | 5.00 |
| Total | 550.00 |

Preparation.—252.5 parts of 5-methyl-3-sulfanilamidoisoxazole and 63.75 parts of 2,4-diamino-5-(3,4,5-trimethoxybenzyl)pyrimidine, 73.75 parts of lactose, 70 parts of cornstarch U.S.P. and 70 parts of prehydrolyzed cornstarch were transferred to a suitable mixer and blended until uniform. The blended powders were passed through a Model D Fitzmill at high speed with hammers forward using a No. 00 screen. This premix was transferred to a suitable blender. The blended powders were granulated with distilled water. The wet granulation was passed through a Model D Fitzmill with knives forward at slow speed using a No. 4B screen. The milled, wet granules were dried at 110° F. The dry granules were passed through a Model D Fitzmill at medium speed with knives forward using a No. 12 screen. The milled, dry granulation was transferred to a suitable blender, and 15 parts of talc and 5 parts of magnesium stearate were added and mixed until uniform. The granulation was compressed on a BB2 Rotary. The punches used were 15/23'', flat beveled edge scored.

Example 5

| Capsule formulation: | Per capsule, mg. |
|---|---|
| 5-methyl-3-sulfanilamidoisoxazole | 250 |
| 2,4-diamino-5-(3,4,5-trimethoxybenzyl) pyrimidine | 25 |
| Lactose | 35 |
| Cornstarch | 35 |
| Magnesium stearate | 5 |
| Total | 350 |

Preparation.—250 parts of 5-methyl-3-sulfanilamidoisoxazole, 25 parts of 2,4-diamino-5-(3,4,5-trimethoxybenzyl)pyrimidine, 35 parts of lactose, 35 parts of cornstarch and 5 parts of magnesium stearate were mixed until thoroughly blended in a suitable size container. The powder was filled in No. 2, two piece, hard shell gelatin capsules to an approximate fill weight of 350 mg. using a Parke Davis capsulating machine.

I claim:

[1. A therapuetic antibacterial composition effective in the treatment of sulfamethoxazole resistant bacterial infections comprising from about 1 to about 30 parts of a sulfonamide selected from the group consisting of 5-methyl-3-sulfanilamidoisoxazole and alkali metal salts thereof with pharmaceutically acceptable bases and one part of a pyrimidine selected from the group consisting of 2,4-diamino-5-(3,4,5-trimethoxybenzyl) pryimidine and salts thereof with pharmaceutically acceptable acids.]

[2. A composition in accordance with claim 1 which contains pharmaceutical adjuvant materials.]

[3. A composition in accordance with claim 1 wherein the sulfonamide is 5-methyl-3-sulfanilamidoisoxazole.]

[4. A compositionn in accordance with claim 3 wherein the pyrimidine is 2,4-diamino-5-(3,4,5-trimethoxybenzyl)-pyrimidine.]

[5. A composition in accordance with claim 1 comprising from about 5 to about 15 parts of 5-methyl-3-sulfoniamidoisoxazole and one part of 2,4-diamino-5-(3,4,5-trimethoxybenzyl) pyrimidine.]

[6. A therapeutic antibacterial composition effective in the treatment of bacterial infections in warm-blooded animals which are caused by sulfamethoxazole resistant strains of bacteria for internal administration in shaped dosage unit form comprising from about 250 mg. to about 750 mg. of 5-methyl-3-sulfanilamidoisoxazole or an alkali metal salt thereof with a pharmaceutically acceptable base and from about 12.5 mg. to about 75 mg. of 2,4-diamino-5-(3,4,5-trimethoxybenzyl) pyrimidine or a salt thereof with a pharmaceutically acceptable acid.]

7. A process for treating a warm-blooded animal afflicted with a bacterial disease *caused by sulfomethoxazole resistant strains of bacteria* comprising orally administering to said warm-blooded animal a therapeutically effective amount of a composition comprising from about 1 to about 30 parts of a sulfonamide selected from the group consisting of 5-methyl-3-sulfanilamidoisoxazole and alkali metal salts thereof with pharmaceutically acceptable bases and one part of a pyrimidine selected from the group consisting of 2,4-diamino-5-(3,4,5-trimethoxybenzyl) pyrimidine and salts thereof with pharmaceutically acceptable acids.

8. A process in accordance with claim 7 wherein the therapeutically effective amount of the composition comprises from about 250 mg. to about 750 mg. of 5-methyl-3-sulfanilamidoisoxazole or an alkali metal salt thereof with a pharmaceutically acceptable base and from about 12.5 mg. to 75 mg. of 2,4-diamino-5-(3,4,5-trimethoxybenzyl) pyrimidine or a salt thereof with a pharmaceutically acceptable acid.

* * * * *

UNITED STATES PATENT AND TRADEMARK OFFICE

CERTIFICATE OF CORRECTION

PATENT NO. : Reissue 28,636

DATED : December 2, 1975

INVENTOR(S) : EMANUEL GRUNBERG

It is certified that error appears in the above-identified patent and that said Letters Patent are hereby corrected as shown below:

Title page No. [54], change title to read as follows:

METHOD OF TREATING RESISTANT BACTERIAL INFECTIONS WITH A COMPOSITION CONTAINING 5-METHYL-3-SULFANIL-AMIDOISOXAZOLE AND TRIMETHOXYBENZYL PYRIMIDINE

Column 6, line 43, "sulfoniamidoisoxazole" should be sulfanilamidoisoxazole

Signed and Sealed this

Second Day of November 1976

[SEAL]

*Attest:*

RUTH C. MASON
*Attesting Officer*

C. MARSHALL DANN
*Commissioner of Patents and Trademarks*